Aug. 14, 1962 W. W. BROTHERS, JR 3,049,057
CARTRIDGE BELT DELINKER AND EJECTOR
Filed Feb. 2, 1960 4 Sheets-Sheet 1
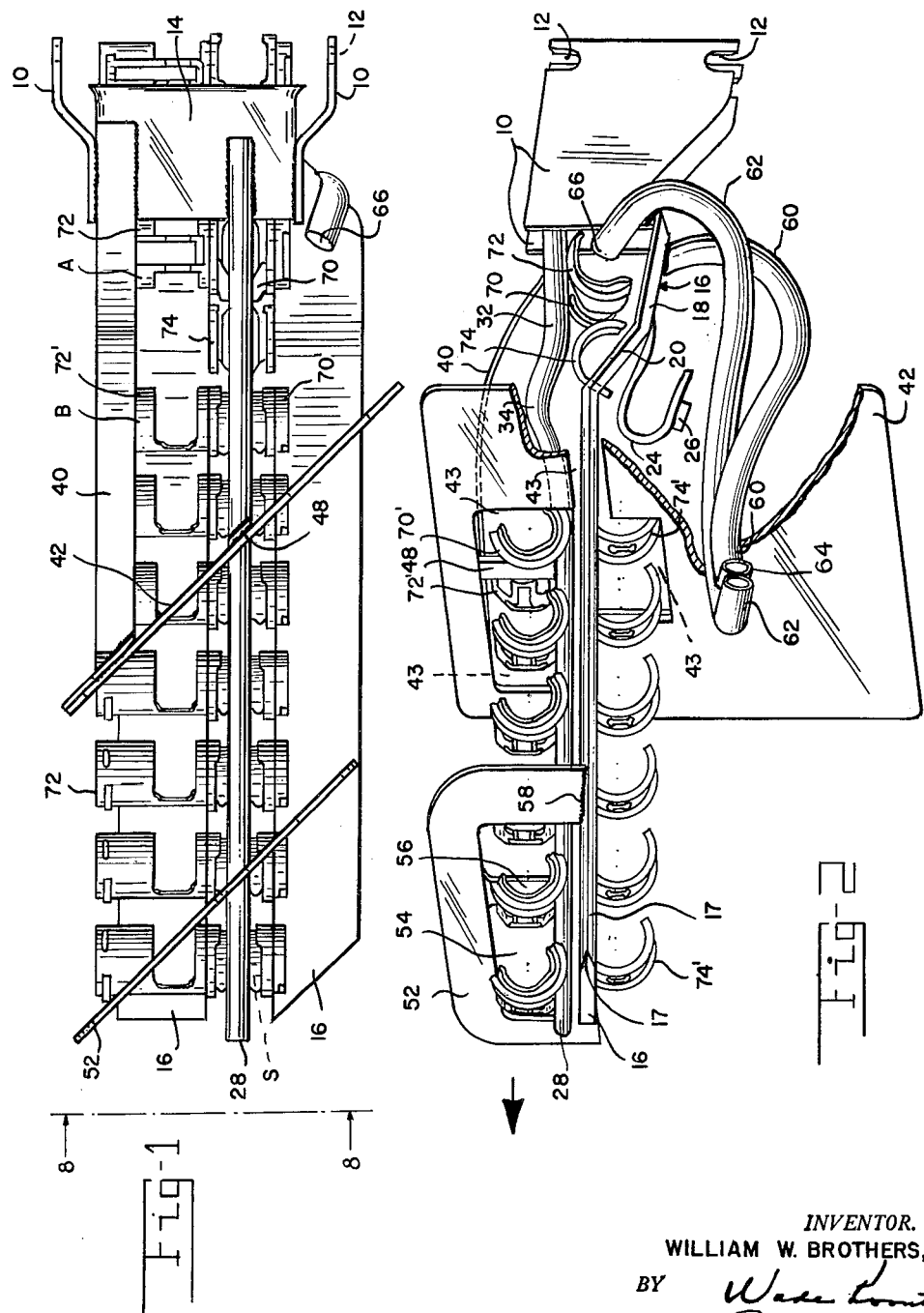
INVENTOR.
WILLIAM W. BROTHERS, JR.
BY
ATTORNEYS Aug. 14, 1962   W. W. BROTHERS, JR   3,049,057
CARTRIDGE BELT DELINKER AND EJECTOR
Filed Feb. 2, 1960   4 Sheets-Sheet 2
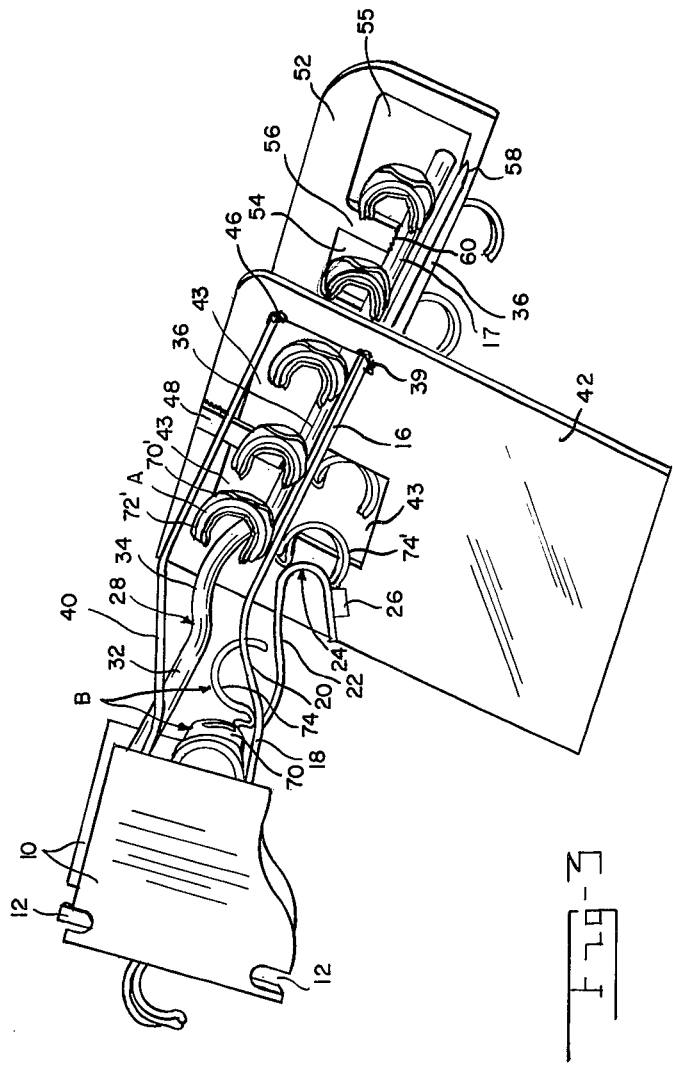
INVENTOR.
WILLIAM W. BROTHERS, JR.
BY
ATTORNEYS Aug. 14, 1962     W. W. BROTHERS, JR     3,049,057
CARTRIDGE BELT DELINKER AND EJECTOR
Filed Feb. 2, 1960     4 Sheets-Sheet 3
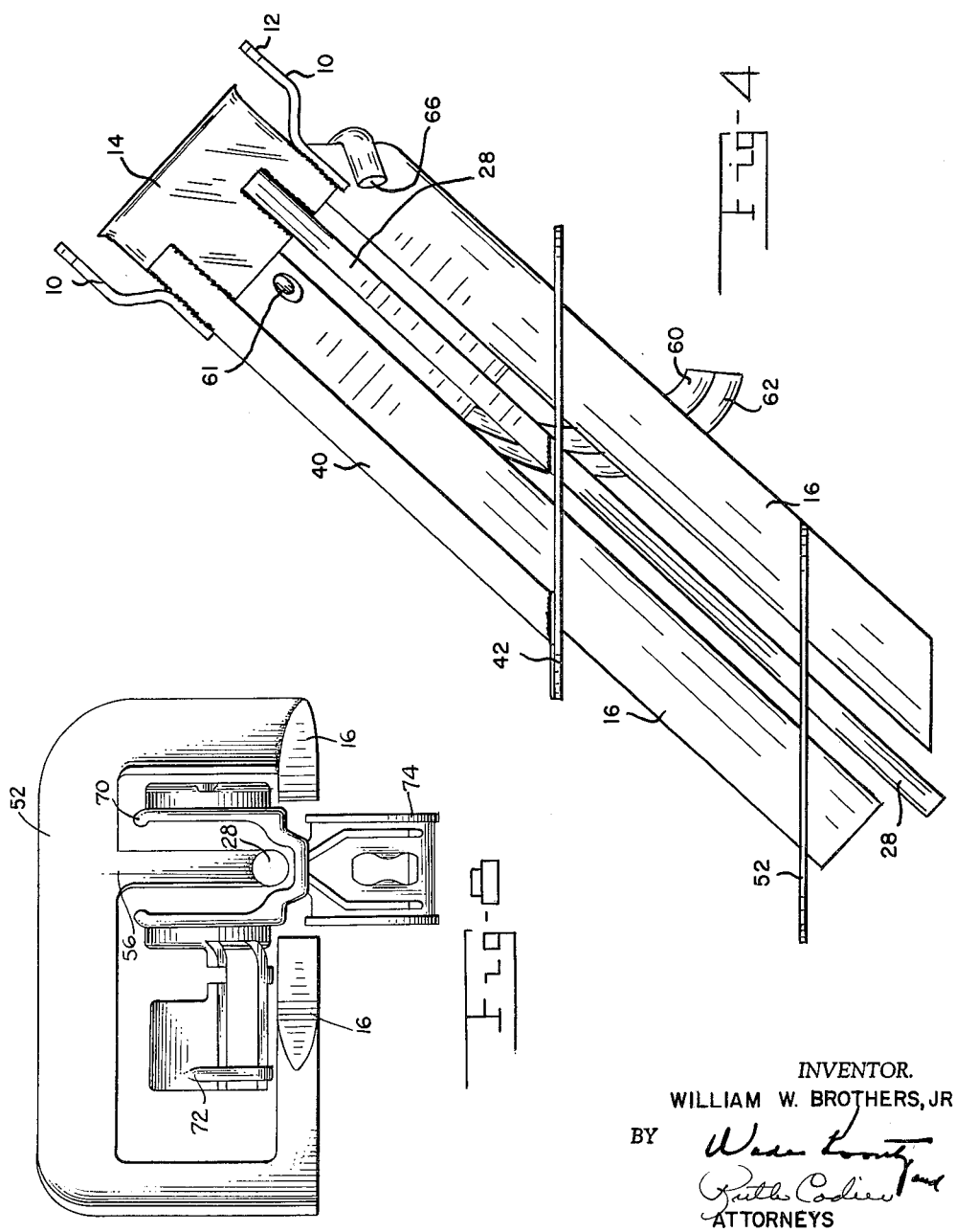
INVENTOR.
WILLIAM W. BROTHERS, JR.
BY
ATTORNEYS

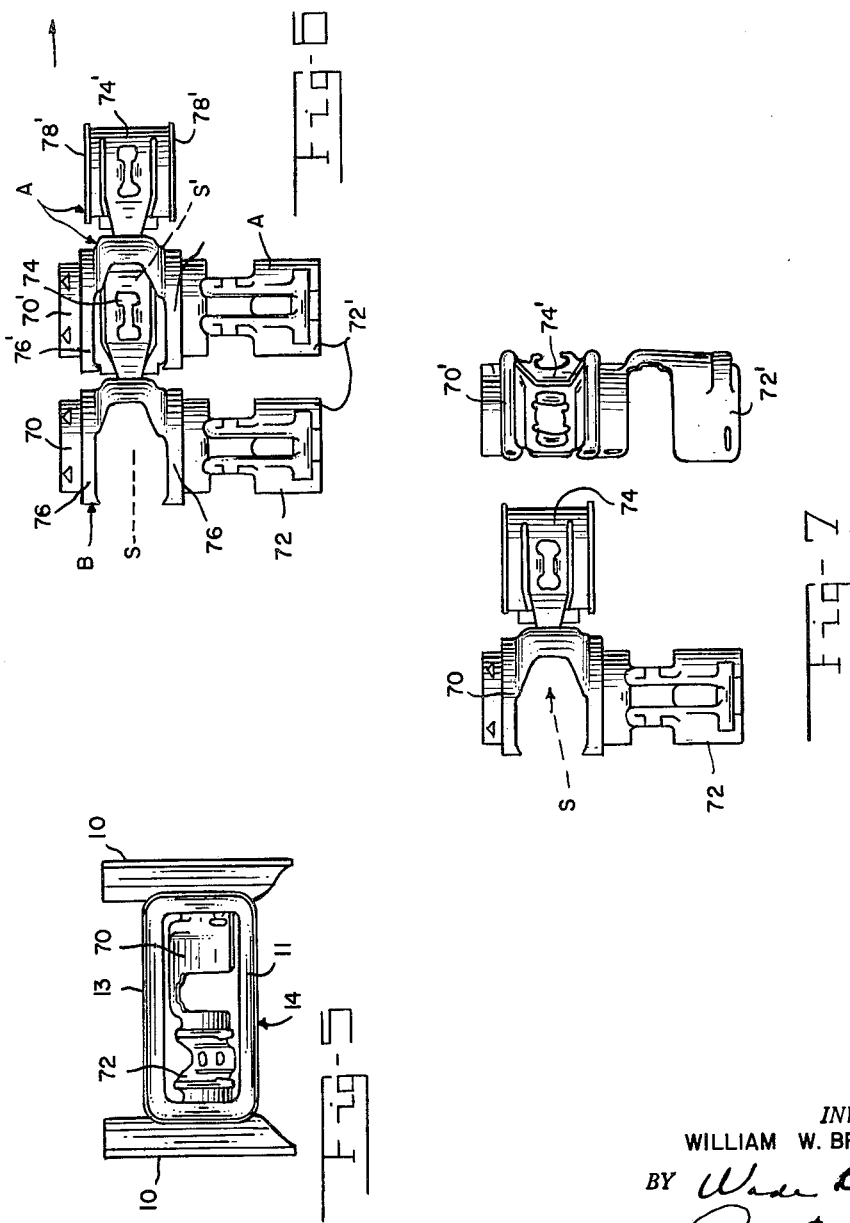

United States Patent Office 3,049,057
Patented Aug. 14, 1962

3,049,057
CARTRIDGE BELT DELINKER AND EJECTOR
William W. Brothers, Jr., Eglin Air Force Base, Fla., assignor to the United States of America as represented by the Secretary of the Air Force
Filed Feb. 2, 1960, Ser. No. 6,331
8 Claims. (Cl. 89—33)
(Granted under Title 35, U.S. Code (1952), sec. 266)

The invention described herein may be manufactured and used by or for the United States Government for governmental purposes without payment to me of any royalty thereon.

The present invention relates to a delinking device for cartridge chains or belts and, more particularly, the invention deals with a device to be attached to the framework of aircraft mounted guns for carrying away the ammunition chain, separating the links of the chain and getting rid of the links outside the aircraft without damage to the aircraft.

An acute problem exists in the disposal of ammunition links of cartridge chains used in cannon installed in present-day high speed jet aircraft. This problem is intensified by the fact that the links expelled from fighter aircraft during firing tend to dribble along the aircraft skin causing damage not only to the aircraft skin but creating the possibility of injection into the jet intakes. This may occur even when the links of the ammunition chain are separated and becomes particularly acute at high speeds. Furthermore, the links themselves tend to remain linked together in a continuous belt. Attempts to cope with this problem have included a variety of spring finger hooks which flip the link out of the ejection chute and into the air stream. However, the link may not be propelled a sufficient distance away from the aircraft to eliminate the hazard of damage to either engine or airframe.

The object of the present invention relates to a device which provides a solution to the acute problems described above.

More specifically, the object of the invention is the provision of a device for delinking the links of the ammunition chain or belt used in conveying 20 mm. or other ammunition to a cannon and, after firing, to delink and expel the links from the aircraft with sufficient force so that the links do not dribble along the skin of the aircraft and cause damage.

A further object of the invention is the provision of a delinking and ejecting device for delinking and expelling into the air stream at supersonic speeds and high altitudes, links, such as the T76 links that have passed through the breech of an operating 20 mm. aircraft cannon or like device.

In the drawing:

FIG. 1 is a top plan view of the device.

FIG. 2 is a side elevational view of the device.

FIG. 3 is a side elevation taken from the opposite side of FIG. 2, without the pipes for the air jet, and showing the angle of tilt.

FIG. 4 is a top plan view of the device without links and showing the angle of tilt.

FIG. 5 is an end view of the device.

FIG. 6 is a top view of two interlinked links of an ammunition belt.

FIG. 7 is a top view of the same two links after one of them has been lifted by the cam rod rotated about a horizontal axis and separated from the other.

FIG. 8 is an end view looking in the direction of the arrow in FIG. 1, the back plate being omitted.

Referring more in detail to the drawing, the device is comprised of a pair of bracket members 10 provided with suitable hooks or depressions 12 for engaging in the standard chuting (not shown) which conducts a cartridge belt from an aerial gun. A channel-like member 14 is located between the bracket members 10 and comprises a floor 11 and a ceiling 13. The links of the chain or belt enter and pass through this channel (see FIG. 5). A pair of spaced guide track members 16 are attached to the lower floor 11 of the channel member 14 and extend outwardly from it and in its plane for a distance indicated by the numeral 18 and at the same level. The guide track members 16 are spaced, one above the other, a distance which will allow a lead cradle of a link to pass therebetween but prevent any other portion of a link to so pass, as hereinafter described. A strip of material 22 is secured to the bottom floor of the channel member 14 between the guide tracks 16. The tracks 16 are curved upwardly to provide camming areas indicated by the numeral 20. The strip portion 22 curves upwardly but at a lesser angle than that taken by the track 16. Then it curves sharply downwardly and rearwardly into a camming area indicated at 24 (see FIG. 3). The cam area 24 is provided on its lower portion with a stop block 26.

A guide rod 28 is attached to the ceiling portion 13 of the channel member 14. The guide rod 28 extends forwardly from the ceiling 13 and at substantially the same level for a distance indicated at 32, curves upward and then downward in the curve 34 to provide a camming surface, and then proceeds forwardly as indicated at 36 in an extended portion which lies between and parallel to the tracks 16, and very slightly thereabove.

An additional upper cam track 40 is welded or otherwise secured to the ceiling of the channel member 14 and lies throughout its extent substantially parallel to the lower guide tracks 16. It is welded to and terminates in a plate 42. Guide tracks 16 are also welded as shown at 39 or otherwise secured to a plate 42, but extend through and beyond an opening 43 therein. The plate 42 is incorporated into the aircraft skin line and is a part of it. A strap 48 is dropped from the top of the opening 43 of the plate 42 and the guide rod 28 is welded to it and is supported by it. This device leaves an unimpeded space between guide members 16 and 28 throughout their length for the threading and passage of the links (latter described).

The device is secured to chuting (not shown) for conveying a cartridge belt away from a gun. The portion of the device to the rear of the plate 42 is positioned within the aircraft and the remaining portion extends downward and the remaining portion extends downward and rearwardly outside of it at approximately a 45° rearward angle (see FIG. 4). The cam tracks 16 extend outwardly and downwardly as shown in FIGS. 3 and 4 extending outside the skin line of the aircraft and are secured by welding 58 or other means to a plate 52. At the skin line, the tracks 16 are thickened, reinforced and beveled down to a thin exterior edge to form a fairing 17 offering as little resistance as possible to the air stream.

The plate 52 (see FIGS. 2 and 3) is of substantially inverted U-shaped form. The lower ends of the arms of the U are welded or otherwise secured adjacent the end portions of the fairing 17 as shown at 58. The guide rod 28 is supported by a strap 56, dropped from the top of the plate 52, and welded thereto. As stated, the guide rod 28 arising from the ceiling of the channel 14 lies between and is spaced from the inner edges of the guide tracks 16 and fairing 17 (see FIG. 1) and also lies a little above them so that the links of the ammunition chain rest upon the tracks and fairing and are threaded on to and guided by the rod 28.

A pair of air jets 60 and 62 are provided with scoop openings 64 located outside the aircraft. The inward portion of the air jet 60 terminates at 61 (see FIG. 4) in or near the area 18 of one of the guide tracks 16. The air jet 62 terminates at 66, a point which is located above the area 18. The device may be used with or without the jets 60 and 62. Their function is to trap air in the air scoop and blow it in a stream to impinge upon the inward curved portion (later described) of the links and facilitate their movement through the device and their disengagement from each other. In ground experimentation these air scoops were found to be necessary to supplement the camming impetus. In conditions of actual flight they were found to be less necessary. All links in the chain are identical.

FIG. 6 shows two such links indicated as A and B in the connected position in which they emerge from the gun, and the position in which they enter the channel 14 and emerge therefrom. The direction of travel is as indicated by arrows in each figure. Each link comprises three inverted U-shaped cradles. Cradles 70 and 72 of the rearward link B lie in a common axis, parallel to the axis of a third inverted cradle portion 74, which is attached laterally and rigidly to the cradle portion 70, and may be termed the lead cradle. For purposes of description the analogous portions of the link B will be designated 70′, 72′ and 74′. The portion 70′ of the link A overlaps the lead cradle 74 of the link B. A pair of inverted annular grooves 76′ fit over a peripheral annular ridge 78 (see FIG. 7) of the link B. The links are thus maintained against transverse displacement with reference to each other but, when the opportunity affords, rotary movement of the annular ridge 78 within the grooves 76 is possible. A cartridge prevents rotation. As long as the links do not rotate, they are held together. It will be observed from FIGURES 6–7 that cradles 70—70′ are bifurcated to provide a large open space S. When lead cradle 74 occupies a cradle 70′ the space S is covered or closed by this lead cradle 74. Thus the lead cradle 74 can be engaged through the space S when same is assembled in cradle 70′. The lead cradles 74—74′ are slightly shorter than cradles 70—70′. The aforementioned guide tracks 16 are spaced to allow cradles 74—74′ to pass therebetween but to engage and prevent cradles 70—70′ from so passing.

FIG. 7 shows in detail a top view of the links at the moment after their separation. FIG. 3 shows the links A and B at the moment after their separation, and shows the means and the process by which they are separated. As the link A emerges from the channel 14, the lead cradle 74′ will pass between the guide members 16, continue to move toward curve 34 of guide rod 28, and finally the outside surface of cradle 74′ will engage this curve 34. At this point the forward edge of cradle 70′, and the forward edge of cradle 72 of link A will be engaged by the camming areas 20 of guide tracks 16. At this point also, the outside surface of forward cradle 74 of link B will be engaged by point 32 of guide rod 28. It will be observed that at the above described point in the operation of the devices: (1) link A is engaged between camming surface 34 of guide rod 28 and camming areas 20 of guide tracks 16 and (2) link B will be engaged by point 32 of guide rod 28. When these conditions prevail, continued movement of the links through the device will cause forward link A to be rotated by virtue of its engagement with the above noted camming surfaces and thereby become detached from the link B and the remainder of the chain. As link A is pivoted the cradle 74′ will move over cam 24 and the edge of the cradle will contact the edge of stop block 26 to thereby arrest the pivotal movement of the link. It will be observed that as the link is being rotated or pivoted it also is being moved bodily through the device. During the pivotal movement of link A the cradle 74 of link B will be retained between guide tracks 16 and guide rod 28. The pivotal and bodily movement of link A is motivated by the movement of link B through the device, etc. This motion may be aided by the jets of air supplied by pipes 60 and 62, or may proceed without this aid, as deemed expedient. After link A has been detached from link B, and therefore from the remainder of the chain, it will have been rotated approximately 90 degrees from its position as it entered the device. The links then glide down the tracks 16 and fairing 17 by gravity and the pushing force of the succeeding links. The downwardly projecting portions 74, 74′ etc. of the links are allowed to pass through the lowermost section of the opening 43 in the plate 42. Each link is guided in its course by being threaded between the guide tracks 16 and the guide rod 28 which lies in the space S of each link. It will be noted that the only attachment of the plates 42 and 52 to the guide rod 28 are the depending straps 48 and 56 respectively, thus leaving an unimpeded space for the travel of the links. The cradles 70 and 72, 70′ and 72′ etc. of the two links A and B respectively, ride along the tracks 16 and fairing 17, the space S allows each one to pass by the depending straps 48 and 56. When the links fall away, they are oriented heavy end forward, with the prevailing surface slanted downward into the passing air stream, and a sufficient distance from the aircraft so that they are carried away without damage to any portion of the aircraft. Photographs taken of test firings showed that the links proceed on a downward path along an imaginary continuation of the projecting members 17 and 28 and curve slowly backward until they form a steady stream parallel to the aircraft belly and approximately three feet below it.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. In combination with an aircraft a device for delinking and ejecting from the aircraft attached links of a cartridge belt, each of said links comprising an inverted lead cradle and an adjacently attached inverted rear cradle, the lead cradle of each pair having underlapping relationship with an overlapping cradle of a preceding link, the rear cradle of each link having overlapping relationship with the lead cradle of the adjacently succeeding link, said device comprising a channel member positioned in said aircraft and adapted to receive into and deliver therefrom the attached links of a cartridge belt, means attached to said channel member for separating the attachment of the links and delivering the links in separated condition a distance outside of said aircraft, said means comprising track means and guide means attached to said channel member and extending through the surface skin of the aircraft, a system of cams on said track means and said guide means constructed to pivot each link to lift the overlapping cradle thereof from the underlapping cradle of the succeeding link to effect its separation therefrom and orient the detached link to a position having its cradles opening in the direction of flight of the aircraft, said track and guide means extending in spaced and parallel relationship through and outside the skin of the aircraft and a distance therefrom for guiding the separated links in threaded condition thereon, and delivering them into the air stream outside said aircraft while in said position.

2. In combination with an aircraft device for delinking and ejecting from the aircraft link of a cartridge belt, each link comprising a pair of inverted and adjacently attached cradles underlapping and overlapping respectively the cradles of preceding and succeeding links of the belt, said device comprising a channel member for receiving and delivering therefrom the attached links of said cartridge belt, a floor and a ceiling on said channel member, a pair of spaced track members attached to said floor and extending therefrom in the same plane, said track members extending through the skin surface of said aircraft and a distance thereybond, a cam strip attached to the floor of said channel member and positioned between said track members, a guide rod attached to the ceiling of said channel member, a system of interacting cams on said tracks, said strip and said guide rod constructed to cam and pivot each link to lift the overlapping cradle thereof from the underlapping cradle of the succeeding link and to effect separation of a first link from the remainder of the belt and to effect orientation of said first link to a position having its cradles opening in the direction of flight of the aircraft, said tracks and guide rod extending through the skin surface of said aircraft in parallel and spaced relation to guide the links in separated condition and deliver them into the air stream in said position at a point spaced from the exterior surface of said aircraft.

3. The combination of claim 2, a plate located at the skin line of said aircraft having an opening for the emergence of portions of said device from the inside to the outside of the aircraft, securing means between said guide tracks and said plate at the underside of said tracks, a strap attached to said plate at the upper edge of said opening, extending downwardly therefrom and secured to and supporting said guide rod at its upper surface to allow unimpeded travel space for said links between said guide tracks and said guide rod.

4. The combination of claim 3 wherein said guide tracks and said guide rod extend below the skin surface of the aircraft and at a rearward angle of the order of 45°, a brace and guide plate of substantial inverted planar U-formation attached to said guide tracks and extending upwardly therefrom in parallel relation to said first-mentioned plate, a strap secured to the upper portion of said inverted U member and attached at its lower end to said guide rod to allow unimpeded space for the travel of said links therethrough.

5. In combination with an aircraft, a device for delinking and ejecting from the aircraft links of a cartridge belt, each of said links comprising an underlapping lead cradle and an overlapping second cradle rigidly attached and opening in the same direction, the axes of the lead and second cradles being parallel, the overlapping second cradle being bifurcated to provide an open space, the lead cradle of each link having underlapping relationship with the overlapping second cradle of a preceeding link, the cradles being constructed so that when the axes of the cradles of one link are coplanar with the axes of the cradles of an adjacent link the two adjacent links will be retained in an assembled relationship and when one link is rotated in the aforementioned direction with respect to an adjacent link such adjacent links may be separated, said device comprising a channel member located within the aircraft to receive into and deliver therefrom a cartridge belt, rigid spaced guide tracks attached to the channel member and extending therefrom to the exterior of the aircraft, a guide rod attached to said channel and extending therefrom to the exterior of the aircraft in parallel relationship to said guide tracks and spaced therefrom, the guide tracks and guide rod having rigid unitary camming portions within the aircraft adapted to coact with a first link to rotate same in said direction to thereby lift the overlapping cradle of said first link from the underlapping lead cradle of a succeeding link to effect separation of said first link from said succeeding link, said camming portions being constructed to rotate each link to a position wherein its cradles open in the direction of flight of the aircraft, the guide tracks being constructed to receive the lead cradle of each link therebetween and the guide rod being constructed to receive the second overlapping cradle thereon in threaded relationship to maintain each link in said position and deliver same into the air stream in said position.

6. In a combination with an aircraft as claimed in claim 5, an air scoop comprising a pipe having a forwardly directed air intake located outside of the aircraft, and an inward end for delivering an air jet into the inverted cradle portions of said links to expedite their severing movements.

7. A rigid unitary delinking and ejecting device for separating links of a cartridge belt and ejecting same from the device, each of said links comprising a first cradle and a second cradle rigidly attached, opening in the same direction and having their axes parallel, said first cradle being longer than said second cradle and having grooves on the inner surface thereof adapted to receive flanges on the outer surface of a second cradle of a succeeding link, said device comprising a channel member having a floor and a ceiling and being adapted to receive a cartridge belt, rigid guide tracks spaced apart a distance greater than the length of the second cradle but less than the length of the first cradle mounted on the floor of the channel member and extending therefrom, said rigid guide tracks being substantially parallel to a first plane throughout their length, said guide tracks having a portion intermediate their ends similarly curved in a direction toward the ceiling of the channel member to thereby provide first camming surfaces, a rigid guide rod fastened to the ceiling of the channel member and extending therefrom in the same direction that the guide tracks extend, said guide rod being substantially parallel to said first mentioned plane, said guide rod having a portion curved in a plane substantially normal to the first mentioned plane to thereby provide a second camming surface, said first and second camming surfaces being substantially co-terminal and being adapted to coact with each link to rotate same approximately 90 degrees from its position as it entered the channel to lift the overlapping cradle thereof from the underlapping cradle of a succeeding link to thereby effect delinking, a stop on said device to arrest the rotation of the links at a proper point, the remaining portions of the guide tracks and the guide rod being adapated to convey the separated links from the delinking device.

8. In a device as claimed in claim 7, air jet means to assist in delinking and ejecting the links from the device.

References Cited in the file of this patent
UNITED STATES PATENTS

| | | |
|---|---|---|
| 2,467,571 | Webb | Apr. 19, 1949 |
| 2,803,169 | Linke | Aug. 20, 1957 |
| 2,817,999 | Cowburn et al. | Dec. 31, 1957 |
| 2,829,562 | La Rue | Apr. 8, 1958 |

FOREIGN PATENTS

| | | |
|---|---|---|
| 126,709 | Great Britain | Feb. 21, 1917 |